No. 698,188. Patented Apr. 22, 1902.
G. H. ELLIS & J. F. STEWARD.
AUTOMOBILE MOWING MACHINE.
(Application filed Jan. 11, 1901.)

(No Model.) 5 Sheets—Sheet 2.

WITNESSES: INVENTORS
Chas. H. Chambers. George H. Ellis
Wm. A. Dreffein. John F. Steward.

No. 698,188. Patented Apr. 22, 1902.
G. H. ELLIS & J. F. STEWARD.
AUTOMOBILE MOWING MACHINE.
(Application filed Jan. 11, 1901.)

(No Model.) 5 Sheets—Sheet 4.

WITNESSES:
Chas. M. Chambers.
Wm. A. Dreffein.

INVENTORS.
George H. Ellis
John F. Steward.

No. 698,188. Patented Apr. 22, 1902.
G. H. ELLIS & J. F. STEWARD.
AUTOMOBILE MOWING MACHINE.
(Application filed Jan. 11, 1901.)

(No Model.)  5 Sheets—Sheet 5.

WITNESSES:
Chas H Chambers
Wm A Dreffein

INVENTORS
George H Ellis
John F Steward

UNITED STATES PATENT OFFICE.

GEORGE H. ELLIS AND JOHN F. STEWARD, OF CHICAGO, ILLINOIS.

AUTOMOBILE MOWING-MACHINE.

SPECIFICATION forming part of Letters Patent No. 698,188, dated April 22, 1902.

Application filed January 11, 1901. Serial No. 42,895. (No model.)

*To all whom it may concern:*

Be it known that we, GEORGE H. ELLIS and JOHN F. STEWARD, of Chicago, in the county of Cook and State of Illinois, have invented certain new and useful Improvements in Automobile Mowing-Machines; and we do hereby declare the following to be a full, clear, and exact description of the invention, such as will enable others skilled in the art to which it appertains to make and use the same, reference being had to the accompanying drawings, forming a part of this specification.

Our invention relates to automobile agricultural machines. We have preferred showing and describing it as applied to an ordinary mowing-machine of a well-known type; but it is evident that it could readily be applied to a variety of machines.

The special object of our invention is to provide a motor attachment for a mowing-machine which can be readily applied with but little adaptation, and, further, to provide a machine which when not used as a mower may be transformed into a traction-engine or an ordinary stationary engine to do duty in many ways, as required on a farm or elsewhere.

Figure 1:
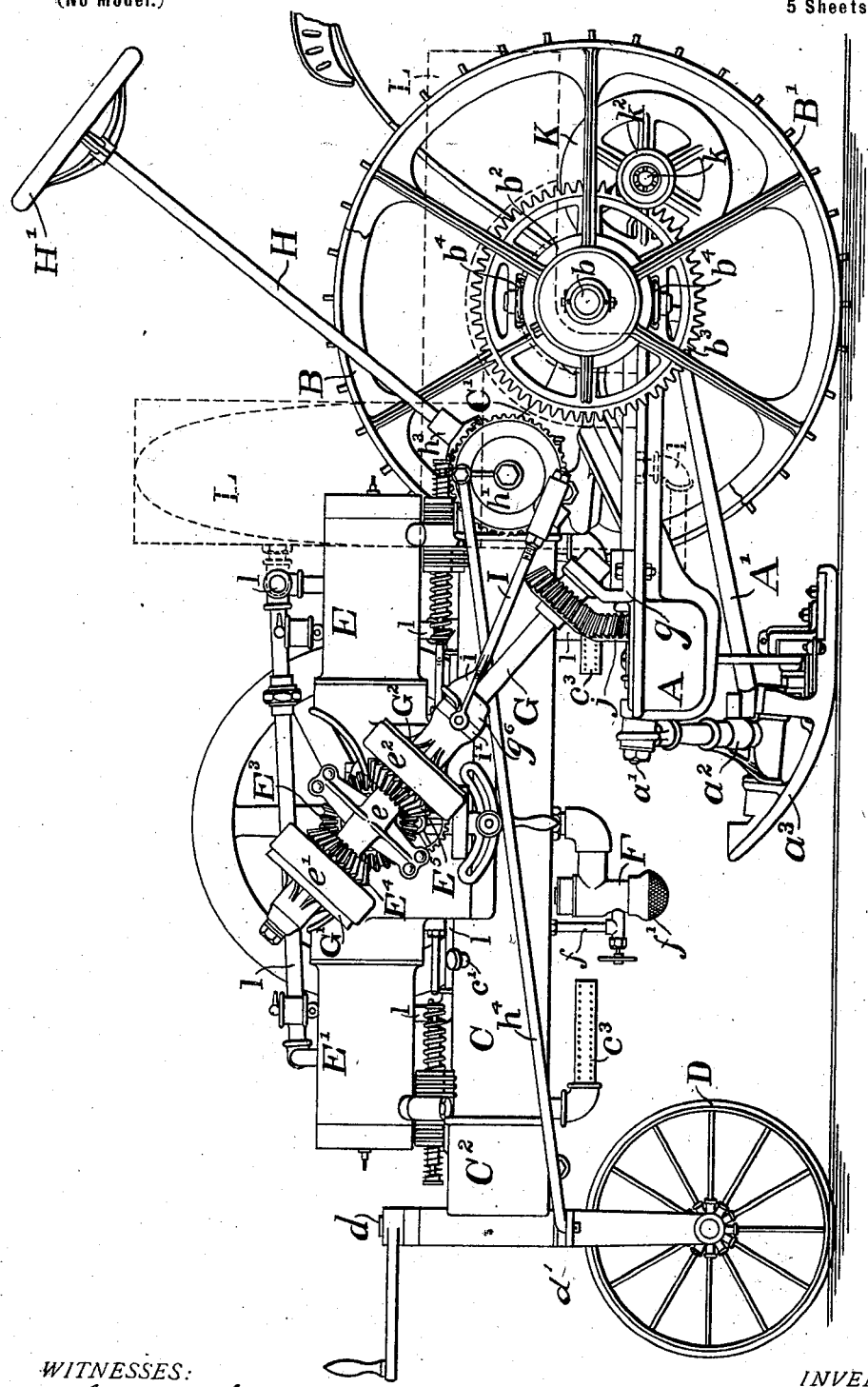
Figure 2:
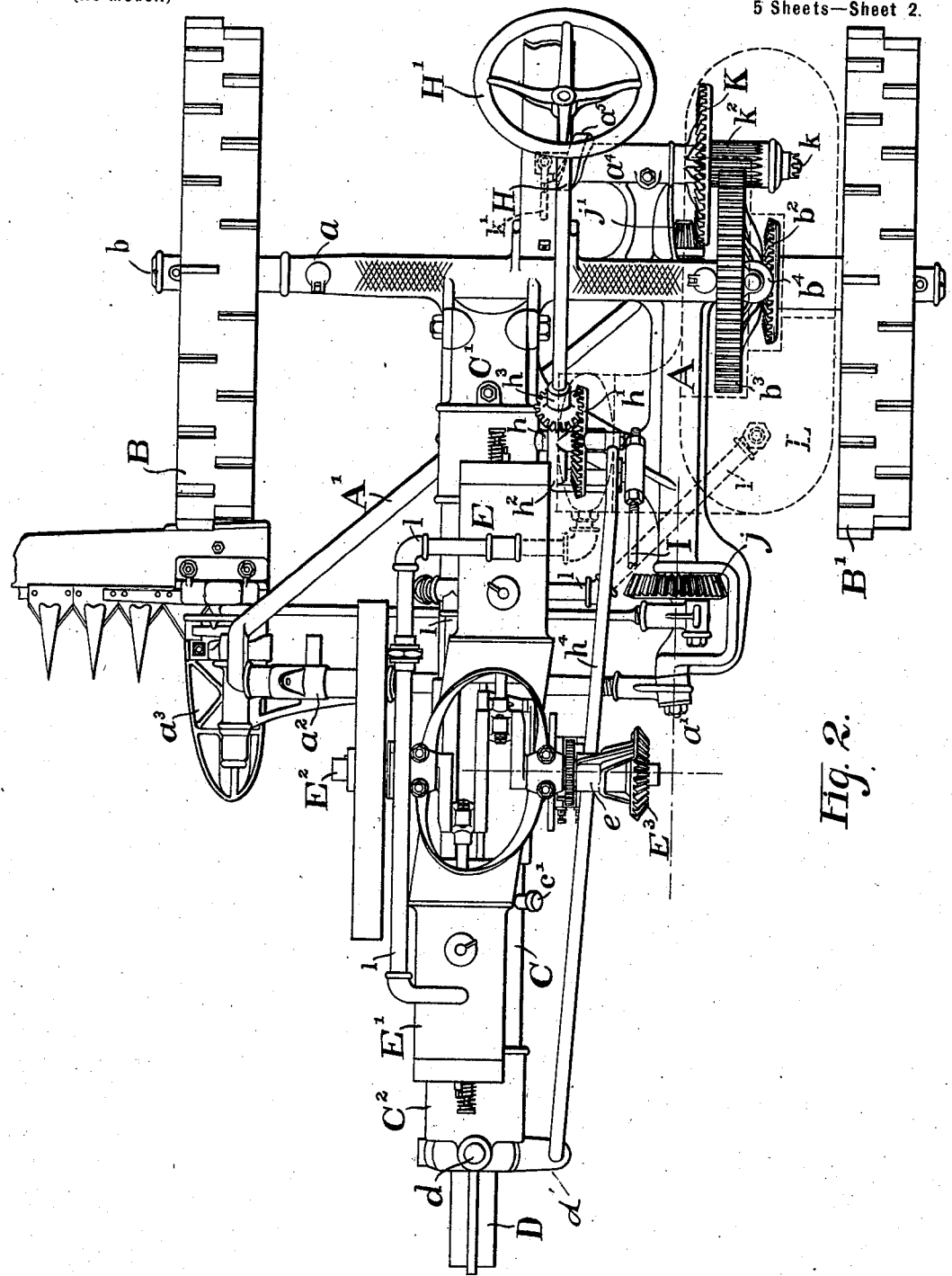
Figure 3:
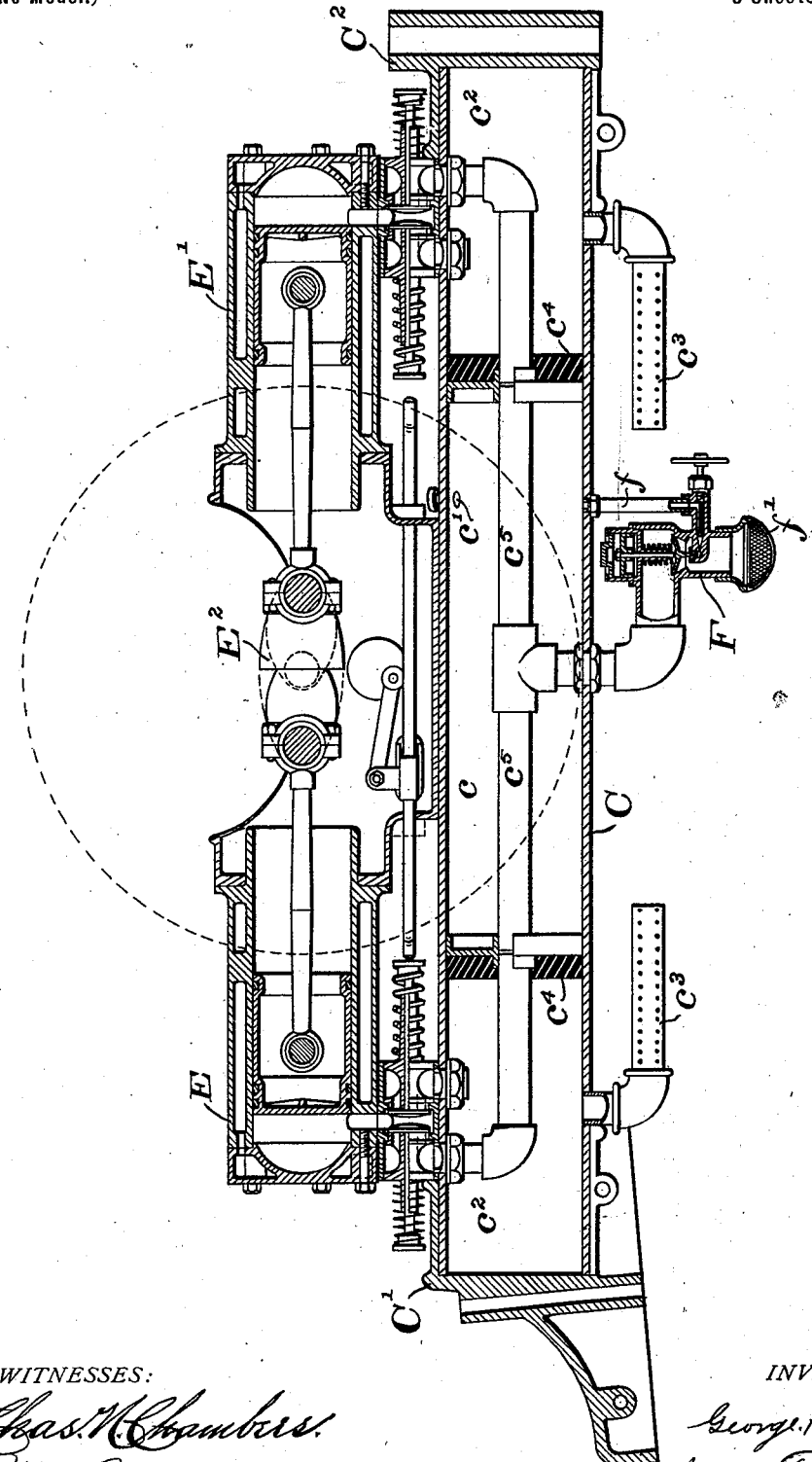

In the drawings, Figure 1 is a stubble-side elevation of our mowing-machine; Fig. 2, a plan view; Fig. 3, a grass-side elevation in section; and Figs. 4, 5, 6, 7, and 8 are details.

A is the mower-frame, and through the sleeve-like portion $a$ the axle $b$ passes.

Figure 4:
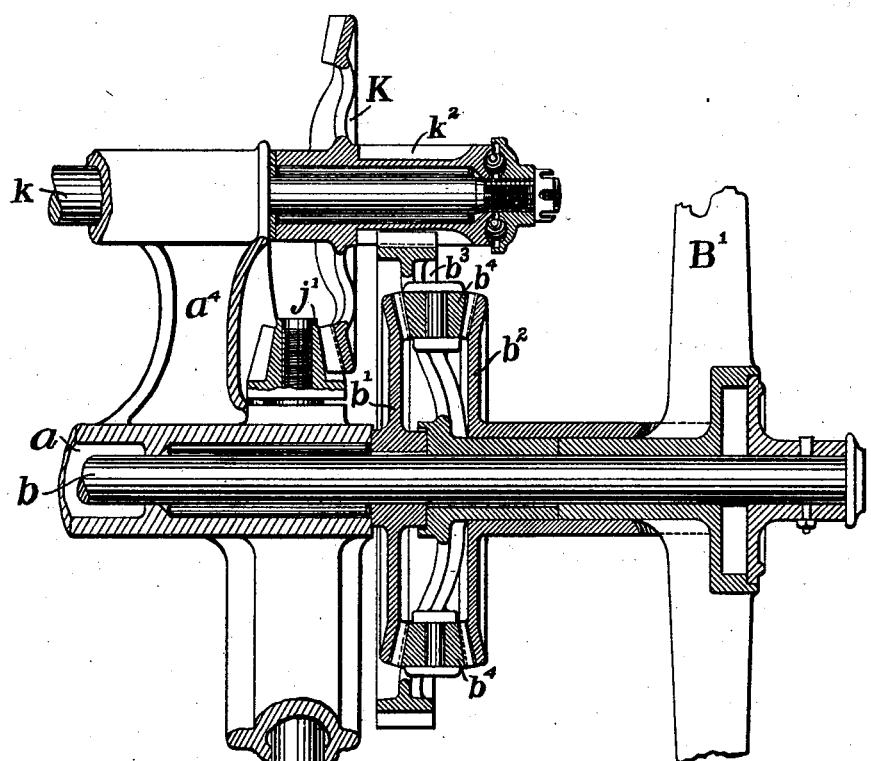
Figure 8:
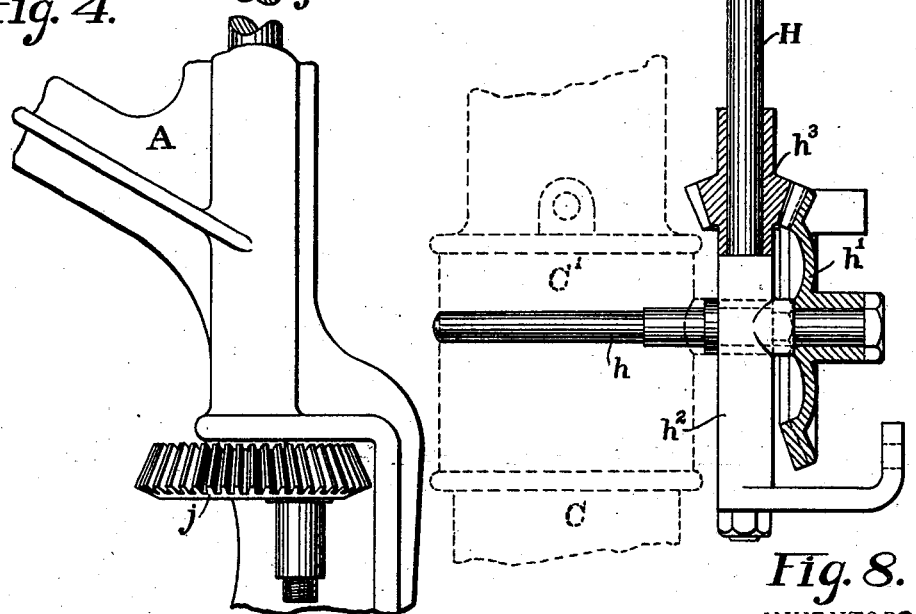
Figure 6:
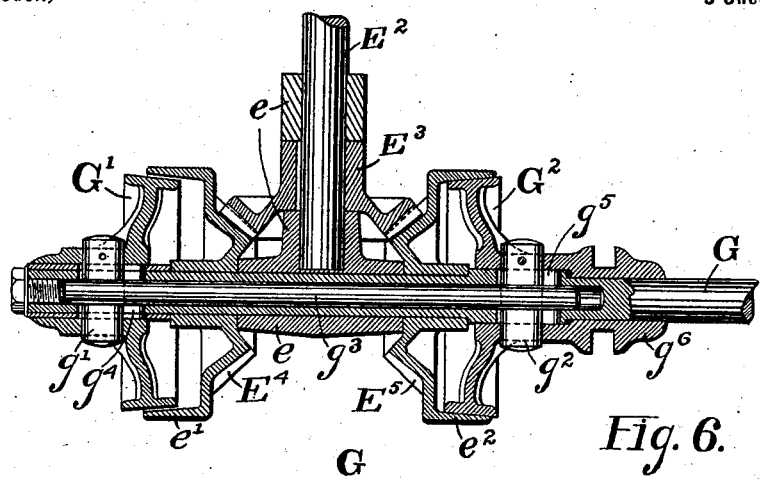

B and B' are the main supporting and driving wheels. The main wheel B is secured directly to the axle $b$, and upon the axle and secured thereto is the bevel-gear $b'$. (Shown in section in Fig. 4.) The main wheel B' is mounted loosely upon the axle $b$ and adapted to turn thereon, but is rigid with the bevel-gear $b^2$, the hub of the bevel-gear being adapted to intermesh with the spokes of the main wheel B' for the purpose. Revolving loosely upon the axle is the spur-gear $b^3$, provided with trunnions, upon which the pinions $b^4$ and $b^4$ operate, each meshing with the bevel-gears $b$ and $b'$. There may be three or four of these pinions, as required. This arrangement of the gearing may be considered, except in the matter of detail, as the ordinary differential gear used for the same purpose upon traction-engines and automobiles. The power from the engine is applied to the spur-gear $b^3$ by suitable connecting-gearing, herein later described, and the supporting-wheels thus caused to rotate. By use of this differential-gear arrangement just described both supporting-wheels upon the driving-axle may be made driving-wheels without interfering with the steering of the machine. The spur-gear $b^3$ with its bevel-pinions $b^4$ are held in proper relation with the bevel-gear $b'$ and the bevel-gear $b^2$ in proper relation with the bevel-pinions $b^4$ by means of their elongated hubs, which abut against the main driving-wheel B', as shown in Fig. 4, the hub of the latter surrounding the former. It is seen, then, that each main wheel has connected with it one of the bevel-gears—one through the instrumentality of the axle, to which it and its bevel-gear are keyed, and the other through the instrumentality of the elongated hub of its bevel-gear, which intermeshes with its spokes.

Upon the forward portion of the main frame is the strong stud $a'$. To this stud and to a corresponding one beneath the axle the coupling-frame A' is pivoted. Upon the coupling-frame is the swivel $a^2$, which is jointed to the shoe $a^3$ in the ordinary manner, and to the shoe is connected the cutting apparatus, as usual. As the cutting apparatus and minor details of controlling the same form no part of this invention they need not be described.

To that part of the frame where the draft-tongue of a mowing-machine is usually attached is secured a strong gas-pipe C by means of the casting C' at its rear end, which fits into the ordinary tongue-socket and is there bolted, as is the tongue of an ordinary mower. At the front end of the said pipe is the casting C², adapted to take the tiller-post $d$ of the tiller-wheel D. (Shown in Figs. 1 and 2.) These castings C' and C² serve also to close the ends of the pipe C, which serves as the bed of the engine. Upon this strong pipe the motor-cylinders E and E' are secured and placed one hundred and eighty degrees apart from preference. These cylinders are mainly of the ordinary form used in gas and oil engines and will not be described in detail in this application, as those details will form the subject-matter of an application to be filed by George H. Ellis. Equidistant between the two cylinders is placed the doubly-cranked shaft $E^2$, mounted in suitable bearings. The engine, like all of its type, is adapted to rotate in but one direction, and hence we have made such provision as will enable us to run our mowing-machine forward or backward at will.

One of the important features of our machine is the use we make of the strong gas-pipe bed C of the engine. It is divided into three parts.

$c$ is the reservoir for gasolene and is filled through the opening $c'$.

$c^2$ and $c^2$ are exhaust-chambers that serve as mufflers.

$c^3$ and $c^3$ are the exhaust-pipes, which are screen-like in order to aid in muffling the exhaust.

$c^4$ and $c^4$ are asbestos or other non-conducting disks so placed as to prevent as much as possible heat passing from the exhaust-chamber to the oil in the reservoir.

F is the carbureter, which may be of any kind, or in lieu thereof a spraying device may be used. It is connected with the pipes $c^5$ and $c^5$, which lead to the cylinders. The gasolene or other volatile oil used passes through the tube $f$ and down through the needle-valves in the carbureter when they are open and the atmosphere is drawn through the screen $f'$ at each alternate stroke of each piston.

Figure 7:
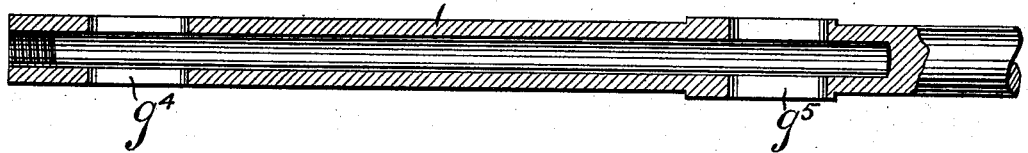
Figure 5:
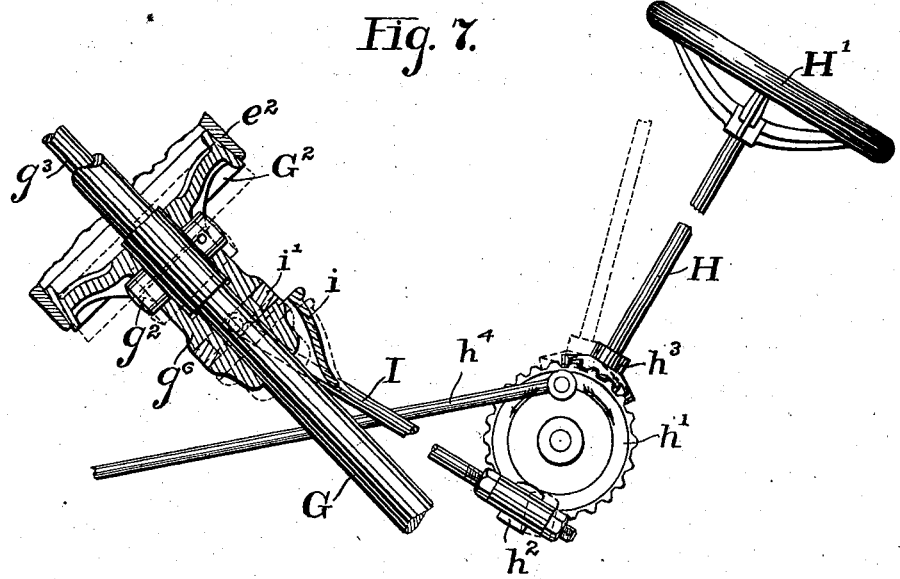

Upon the engine crank-shaft $E^2$ is the bevel-gear $E^3$. Supported upon the shaft, as partly shown in section in Fig. 6 and in full in Figs. 1 and 2, is the bracket $e$. This bracket serves as a support for the diagonally-placed shaft G at its upper end. The shaft at its lower end is supported in the bearing $g$ upon the mower-frame. Upon the upper end of the shaft is the arrangement of gearing. (Best seen in section in Fig. 6.) The bevel-gear $E^3$ is keyed or otherwise secured to the engine-shaft. The shaft G is shown in Fig. 7. It will be seen that the shaft G is free to revolve in the bracket $e$ and that the bevel-gears $E^4$ and $E^5$ are adapted to revolve freely upon said shaft. The bevel-gears are each formed with flanges $e'$ and $e^2$, the interior surfaces of which are conical and smooth.

Upon the shaft G, adapted to slide a limited distance longitudinally therewith, to which reference will be made later, are the disks $G'$ and $G^2$, the peripheral surfaces of which correspond in their angle with the interior surfaces of the flanges $e'$ and $e^2$ on the bevel-gears. In order that the disks $G'$ and $G^2$ may be forced to rotate with the shaft G, the strong keys $g'$ and $g^2$ pass through the said shaft and the hubs of the said disks. The shaft G has a hole bored longitudinally in its center a desired distance to accommodate the rod $g^3$, which is adapted to slide therein. This rod is provided with keyways to receive the keys $g'$ and $g^2$. These keys fit snugly the keyways in the rod $g^3$ and the disks $G'$ and $G^2$, thus firmly securing the two disks together. The keyways $g^4$ and $g^5$ in the shaft G, however, are somewhat wider than the keys $g'$ and $g^2$ received therein, thus allowing the longitudinal movement of the disks $G'$ and $G^2$, to which reference is made above. In the enlarged hub $g^6$ of the disk $G^2$ is a groove into which a suitable fork may pass for giving this longitudinal movement to the disk $G^2$ and through the instrumentality of the rod $g^3$ and the keys $g'$ and $g^2$ gives simultaneous movement to the disk $G'$. It will be readily seen that with the parts in the position shown in Fig. 6 if the grooved hub $g^6$ be drawn down the friction-clutch formed by the disk $G^2$ and the flange $e^2$ on the bevel-gear $E^5$ will be disengaged and the friction-clutch formed by the disk $G'$ and the flange $e'$ on the bevel-gear $E^4$ will be thrown into engagement. We do not limit ourselves to any particular form of friction-clutch, as any doubly-acting clutching device of similar construction may be used. It will be readily seen that by acting upon the grooved hub $g^6$ either of the friction-clutches may be thrown into engagement and the shaft thus be given a movement in whichever direction is required.

Mounted upon the frame of the mowing-machine upon the strong stud $h$ is the lever H. It is, in fact, a shaft; but so far as controlling the clutches is concerned it may be considered a lever pivoted upon this stud $h$, that also supports the bevel-gear $h'$. Passing from the lower end of this lever forward and upward above the shaft G is the rod I, which terminates in a fork $i$, adapted to engage the groove in the hub $g^6$ of the disk $G^2$. In order to give wearing-surface, we have shown a ring $i'$, placed in the groove and the fork just mentioned, adapted to engage trunnions thereon. By movement of the lever H (in this instance a shaft) either clutch may be thrown into or out of engagement at will.

Upon the tiller-stem $d$ is secured the arm $d'$, and from said arm to a wrist on the bevel-gear $h'$ the connecting-rod $h^4$ passes. By rotation of this bevel-gear the tiller-wheel D may be controlled. Upon the stud $h$ is the bracket $h^2$, (shown in Fig. 8,) which when treating of the shaft H as a lever for controlling the clutches may be considered as one part with it; but when treating of H as a shaft it must be understood that it is free to revolve in the bracket $h^2$. Secured to the upper end of the shaft H, within easy reach of the operator, is the hand-wheel $H'$. Upon the shaft H is the bevel-pinion $h^3$, adapted to mesh with the bevel-gear $h'$. It is plain that rotation of the shaft H in either direction will cause the bevel-gear $h'$ to rotate in a corresponding direction, thus controlling the tiller-wheel. Rocking the shaft upon the stud $h$ it performs the office of a lever merely and as such controls the clutches.

Referring to Figs. 1, 2, and 4, the means for transmitting power from the engine to the motor-wheels will be understood. Within the usual bearings of a mowing-machine of the kind the crank-shaft J is supported. Upon the forward end of the crank-shaft is placed the bevel-gear $j$. This bevel-gear also serves as a crank-wheel. Upon it the usual wrist for moving the pitman and knife is placed. Upon the lower end of the shaft G is secured the bevel-gear $g^7$, which is adapted to mesh into the bevel-gear $j$ on the crank-shaft. Upon the rear end of the crank-shaft is the bevel-pinion $j'$, which meshes with the bevel-gear K, journaled upon a strong pin $k$, secured in the strong arm $a^4$, which is as one piece with the mower-frame. The bevel-gear K has as one piece with it the spur-pinion $k^2$. By means of a scroll-like cam $a^5$ the longitudinal position of the strong pin $k$, and consequently the bevel-gear K, is regulated, and by said longitudinal movement the bevel-gear K is thrown out of mesh with the pinion $j'$. This means for throwing the gearing out of mesh is fully shown and described in the patent granted to John F. Steward, No. 554,010, dated February 4, 1896, and need not be further described here. Suffice it to say that the lever $k'$, (shown in dotted lines in Fig. 2,) secured to the end of this pin, serves as a means for engaging and disengaging the gear, and thus forms a substitute for a clutch, which, by the way, may be used in its stead. We do not limit ourselves to the use of this special form of clutch already given for connecting the transmitting devices of the engine with the main supporting and traction wheels. The spur-pinion $k^2$ meshes with the gear $b^3$ heretofore described. It is readily seen that when the bevel-gear K and the bevel-pinion $j'$ are in mesh and the engine running the power of the engine applied through the crank-shank serves not only to move the cutting apparatus, but to impart movement to the main supporting and driving wheels in either direction.

Supported upon the main frame of the mowing-machine is the water-tank L. (Shown in dotted lines in Figs. 1 and 2.) One portion of it is made sufficiently high as to extend some distance above the cylinders. From this tank extends the pipe $l$, which may be traced from the bottom of the tank through the jackets of the cylinders and back to the top of the tank by referring to letters $l$, $l$, and $l$. We have preferred showing this manner of cooling the cylinders; but it is evident that radiating fins could be used instead. Hence we do not limit ourselves to this exact construction.

What we claim as our invention, and desire to secure by Letters Patent, is—

1. In a mowing or other machine adapted to perform work while being self-propelled over the ground, a rotatable shaft, as J, connecting mechanism adapted to operate the parts required to perform the said work while passing over the ground, said shaft connected to the traction-wheels by gearing adapted to permit the traction-wheels to operate independently when either is under restraint caused by the steering mechanism, a motor for said shaft, and means between the motor and shaft to cause the driving action of the motor upon said shaft to be either forward or backward, all combined with the steering mechanism substantially as described.

2. In a mowing or other machine adapted to perform work while being self-propelled over the ground, a rotatable shaft, as J, connecting mechanism adapted to operate the parts required to perform the said work while passing over the ground, said shaft connected to the traction-wheels by differential gearing adapted to permit the traction-wheels to operate independently when either is under restraint caused by the steering mechanism, motor for said shaft, and means between the motor and shaft to cause the driving action of the motor upon the shaft to be forward or backward, all combined with the steering mechanism substantially as described.

3. In a mowing or other machine adapted to perform work while being self-propelled over the ground, a rotatable shaft, as J, connecting mechanism adapted to operate the parts required to perform the said work while passing over the ground, said shaft connected to the traction-wheels by differential mechanism, and a clutching mechanism interposed between the said shaft J and the differential mechanism whereby the propelling force may be disconnected from the traction-wheels, all combined substantially as described.

4. In a mowing or other machine adapted to perform work while being self-propelled over the ground, a rotatable shaft, as J, said shaft connected by suitable gearing to the traction-wheels and also adapted, by suitable connecting mechanism, to perform work while so traveling over the ground, the combination therewith of a motor suitably geared to said shaft whereby the motive power of said motor, through the instrumentality of said shaft, is transmitted, in part to the traction-wheels and in part to that portion of the mowing-machine adapted to perform the labor required while passing over the ground, the said mechanism for transmitting motion from the motor to the said shaft consisting essentially of means for converting the single action of the motor into either a forward or backward drive, substantially as described.

5. In a mowing or other machine adapted to perform work while being self-propelled over the ground, a rotatable shaft, as J, said shaft connected by suitable gearing to the traction-wheels and also adapted, by suitable connecting mechanism, to perform work while so traveling over the ground, the combination therewith of a motor suitably geared to said shaft whereby the motive power of said motor, through the instrumentality of said shaft, is transmitted, in part to the traction-wheels and in part to that portion of the mowing-machine adapted to perform the labor required while passing over the ground, the said mechanism for transmitting motion from the motor to the said shaft consisting essentially of a reversibly-acting clutching mechanism, said clutching mechanism consisting of a gear on the motor-shaft, a shaft, as G, suitably geared to the shaft from which power is distributed to various working parts of the machine, and having the loosely-moving gears $E^4$ and $E^5$ thereon, and the friction-clutches $G'$ and $G^2$ for locking either of the said gears to the said shaft at will, substantially as described.

6. In an automobile mowing or other machine main supporting and traction wheels, framework for the working parts carried thereon, a supplemental supporting wheel, or wheels, as D, a reach connecting the parts in which said wheels are supported, said reach forming at the same time the bed of the engine and fuel-reservoir, substantially as described.

7. In an automobile mowing or other machine main supporting and traction wheels, framework for the working parts carried thereon, a supplemental supporting wheel, or wheels, as D, a reach connecting the parts in which said wheels are supported, said reach consisting of a tube forming the bed of the motor, a fuel-reservoir, and an exhaust chamber, or chambers, for the said motor, substantially as described.

8. In an automobile mowing or other machine main supporting and traction wheels, framework for the working parts carried thereon, a supplemental supporting wheel, or wheels, as D, a reach connecting the parts in which said wheels are supported, said reach consisting of a tube forming an oil-reservoir and exhaust chamber, or chambers, and casting closing the ends of the tube and constituting the ends of the exhaust-chambers, substantially as described.

9. In a mowing or other machine adapted to perform work while being self-propelled over the ground, the combination of the main supporting and traction wheels, a framework for the working parts carried thereon, a supplemental supporting wheel or wheels, a reach comprising a tube, castings closing the ends of the tube and constituting the connection between the tube and the parts in which the wheels are supported, and dividing-partitions in said tube forming a fuel-reservoir and exhaust-chambers, said tube also constituting the bed of the engine.

10. In a mowing or other machine adapted to perform work while being self-propelled over the ground, the combination of a shaft, as J, having a gear connection with the traction-wheels, an engine for driving the shaft J, a reversing-gear in the train of gears between the engine and the traction-wheels, a lever controlling said reversing-gear, a guiding-wheel, and a connection between said wheel and the lever whereby the latter may also control the wheel.

11. In a mowing or other machine adapted to perform work while being self-propelled over the ground, the combination of a shaft, as J, having a gear connection with the traction-wheels, an engine for driving the shaft J, a reversing-gear between the engine-shaft and the shaft J, an oscillating lever controlling said reversing-gear, a guiding-wheel, a gear $h'$ having a wrist-pin connected by rod $h^4$ with the guiding-wheel, and a pinion $h^3$ on the reversing-lever in mesh with the gear $h'$, whereby the oscillation of the lever controls the reversing-gear, and the axial rotation of the lever controls the guiding-wheel.

12. In a mowing-machine adapted to perform work while being self-propelled over the ground, the combination with a one-way engine, the cutter crank-shaft, a reversing-gear connection between said shaft and the engine, and a driving-gear connection between the shaft and the traction-wheels.

13. In a mowing-machine adapted to perform work while being self-propelled over the ground, the combination with a one-way engine, the crank-shaft, a reversing-gear connection between said shaft and the engine, a counter-shaft in rear of the axle, a bevel-wheel gearing with a pinion on the rear end of the crank-shaft and having a spur-pinion $k^2$ rigid therewith, a driving-gear $b^3$ operated by said pinion, bevel-wheels $b'$, $b^2$, connected respectively to the two traction-wheels, and idlers $b^4$, $b^4$, connecting the bevel-wheels to the driving-gear.

14. In a mowing-machine adapted to perform work while being self-propelled over the ground, the combination of the cutting apparatus, the cutter crank-shaft, an engine, having a gear connection with a driving-pinion $j$ on the front end of the shaft, and a wheel $j'$ on the rear end of the shaft for communicating power from the shaft.

15. In a mowing-machine adapted to perform work while being self-propelled over the ground, the combination of the main frame having a tongue-socket, an axle and traction-wheels carried by said frame, an engine-bed fitting in said socket at its rear end, a supporting-wheel for the front end of the bed, and gearing between the engine and traction-wheels.

In testimony whereof we affix our signatures in the presence of two witnesses.

GEORGE H. ELLIS.
JOHN F. STEWARD.

Witnesses:
CHAS. M. CHAMBERS,
WM. A. DREFFEIN.